United States Patent
Sasakido et al.

(10) Patent No.: US 9,349,041 B2
(45) Date of Patent: May 24, 2016

(54) INFORMATION PROCESSING DEVICE, SPECIFYING METHOD, AND NON-TRANSITORY COMPUTER READABLE STORAGE MEDIUM

(71) Applicant: YAHOO JAPAN CORPORATION, Tokyo (JP)

(72) Inventors: Hiroki Sasakido, Tokyo (JP); Ayaka Hirano, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 323 days.

(21) Appl. No.: 14/018,802

(22) Filed: Sep. 5, 2013

(65) Prior Publication Data

US 2015/0063665 A1 Mar. 5, 2015

(30) Foreign Application Priority Data

Aug. 28, 2013 (JP) ................................. 2013-177352

(51) Int. Cl.
*G06K 9/00* (2006.01)
*G06K 9/20* (2006.01)

(52) U.S. Cl.
CPC ........ *G06K 9/00362* (2013.01); *G06K 9/00302* (2013.01); *G06K 9/00671* (2013.01); *G06K 9/209* (2013.01)

(58) Field of Classification Search
None
See application file for complete search history.

(56) References Cited

U.S. PATENT DOCUMENTS

| 6,909,793 | B1 * | 6/2005 | Mori | A61B 5/02055 348/14.07 |
|---|---|---|---|---|
| 8,014,763 | B2 * | 9/2011 | Hymes | H04M 1/26 455/414.2 |
| 8,704,760 | B2 * | 4/2014 | Kang | G06F 3/011 345/156 |
| 2009/0307222 | A1 * | 12/2009 | Matraszek | G06F 17/30265 |
| 2013/0144937 | A1 * | 6/2013 | Lee | G06Q 50/01 709/203 |
| 2013/0278631 | A1 * | 10/2013 | Border | G02B 27/017 345/633 |
| 2014/0040010 | A1 * | 2/2014 | Garcia-Martinez | G06Q 30/02 705/14.43 |
| 2014/0280555 | A1 * | 9/2014 | Tapia | G06Q 50/01 709/204 |
| 2014/0280558 | A1 * | 9/2014 | Jakubik | G06Q 50/01 709/204 |
| 2014/0289323 | A1 * | 9/2014 | Kutaragi | G06Q 50/01 709/203 |

FOREIGN PATENT DOCUMENTS

JP A-2005-303734 10/2005

* cited by examiner

*Primary Examiner* — Nancy Bitar
(74) *Attorney, Agent, or Firm* — Oliff PLC

(57) ABSTRACT

An information processing device includes an acquiring unit that acquires target information representing a shooting target shown in an image shot by a user and biological information acquired from the user when the image is shot for each plurality of images shot by the user. The information processing device includes an extracting unit that extracts biological information corresponding to target information representing the shooting target from the biological information acquired by the acquiring unit for each shooting target. The information processing device includes a specifying unit that specifies the user's emotion for the shooting target using the biological information extracted by the extracting unit.

15 Claims, 16 Drawing Sheets

FIG.5

| TARGET INFORMATION | | | | AWAKENING DEGREE | PLEASANT DEGREE | |
|---|---|---|---|---|---|---|
| B | C |   |   | 0.50 | -1.00 | ⎫ |
| B |   | D |   | 4.00 | 0.50 | ⎬ (A) |
| B |   |   | E | 0.50 | -3.00 | ⎭ |
|   | C | D |   | 0.50 | 3.50 | |
|   | C |   | E | -3.00 | 0.00 | |
|   |   | D | E | 0.50 | 1.50 | |
| B | C | D |   | 1.67 | 1.00 | ⎫ |
| B | C |   | E | -0.67 | -1.33 | ⎬ (A) |
| B |   | D | E | 1.67 | -0.33 | ⎭ |
|   | C | D | E | -0.67 | 1.67 | |
| B | C | D | E | 0.50 | 0.25 | ⎱ (A) |
| B |   | D |   | 3.00 | 1.08 | |
|   | C | D | E | 2.00 | 1.55 | |
|   |   | D | E | 2.02 | 3.52 | |
| B |   |   | E | 3.06 | -1.02 | (A) |
| ⋮ | ⋮ | ⋮ | ⋮ | ⋮ | ⋮ | |

| USER ID | TARGET INFORMATION | EMOTIONAL INFORMATION |
|---|---|---|
| A | B | SUPER NEGATIVE STATE |
| | C | POSITIVE STATE |
| | D | SUPER POSITIVE STATE |
| | E | POSITIVE STATE |
| | ⋮ | ⋮ |
| ⋮ | ⋮ | ⋮ |

FIG.8

| TARGET INFORMATION | AWAKENING DEGREE AVERAGE | PLEASANT DEGREE AVERAGE | EMOTIONAL INFORMATION | |
|---|---|---|---|---|
| B | 1.17 | -0.56 | SUPER NEGATIVE STATE | ~(F) |
| C | -0.17 | 0.17 | POSITIVE STATE | |
| D | 1.17 | 0.35 | SUPER POSITIVE STATE | |
| E | -0.17 | -0.18 | NEGATIVE STATE | |

FIG.9

| TARGET INFORMATION | | | AWAKENING DEGREE | PLEASANT DEGREE | |
|---|---|---|---|---|---|
| C | D |   | 0.50 | 3.50 | (G) |
| C |   | E | -3.0 | 0.00 | |
|   | D | E | 0.50 | 1.50 | |
| C | D | E | -0.67 | 1.67 | (G) |
| C | D | E | 2.00 | 1.55 | |
|   | D | E | 2.02 | 3.52 | |
| ⋮ | ⋮ | ⋮ | ⋮ | ⋮ | |

FIG.10

| TARGET INFORMATION | AWAKENING DEGREE AVERAGE | PLEASANT DEGREE AVERAGE | EMOTIONAL INFORMATION |
|---|---|---|---|
| C | -1.06 | 1.72 | POSITIVE STATE |
| D | 0.11 | 2.22 | SUPER POSITIVE STATE |
| E | -1.06 | 1.06 | POSITIVE STATE ~(H) |

FIG.11

| Target Information | | | | Awakening Degree | Pleasant Degree | Emotional Information |
|---|---|---|---|---|---|---|
| B | C | | | 0.5 | -1.00 | SUPER NEGATIVE STATE ~(I) |
| B | | D | | 4.00 | 0.50 | SUPER POSITIVE STATE |
| B | | | E | 0.50 | -3.00 | NEGATIVE STATE |
| | C | D | | 0.50 | 3.50 | SUPER POSITIVE STATE |
| | C | | E | -3.0 | 0.00 | |
| | | D | E | 0.50 | 1.50 | SUPER POSITIVE STATE |
| B | C | D | | 1.67 | 1.00 | SUPER POSITIVE STATE |
| B | C | | E | -0.67 | -1.33 | SUPER NEGATIVE STATE ~(I) |
| B | | D | E | 1.67 | -0.33 | NEGATIVE STATE |
| | C | D | E | -0.67 | 1.67 | POSITIVE STATE |
| B | C | D | E | 0.50 | 0.25 | SUPER POSITIVE STATE |
| B | | D | | 3.00 | 1.08 | SUPER POSITIVE STATE |
| | C | D | E | 2.00 | 1.55 | SUPER POSITIVE STATE |
| | | D | E | 2.02 | 3.52 | SUPER POSITIVE STATE |
| B | | | E | 3.06 | -1.02 | SUPER NEGATIVE STATE ~(I) |
| ⋮ | ⋮ | ⋮ | ⋮ | ⋮ | ⋮ | ⋮ |

FIG.12

| TARGET INFORMATION | AWAKENING DEGREE AVERAGE | PLEASANT DEGREE AVERAGE | EMOTIONAL INFORMATION |
|---|---|---|---|
| C | -0.29 | 1.68 | POSITIVE STATE |
| D | 0.87 | 2.35 | SUPER POSITIVE STATE |
| E | 0.17 | 1.65 | SUPER POSITIVE STATE ~(J) |

INFORMATION PROCESSING DEVICE, SPECIFYING METHOD, AND NON-TRANSITORY COMPUTER READABLE STORAGE MEDIUM

CROSS-REFERENCE TO RELATED APPLICATION

The present application claims priority to and incorporates by reference the entire contents of Japanese Patent Application No. 2013-177352 filed in Japan on Aug. 28, 2013.

BACKGROUND OF THE INVENTION

1. Field of the Invention

The present invention relates to an information processing device, a specifying method, and a recording medium.

2. Description of the Related Art

In the past, there have been known techniques of determining a user's mental state or emotion based on biological information acquired from the user and providing a service according to the user's determined mental state or emotion. As an example of such techniques, there has been known a technique of a communication device that causes an emotion at the time of shooting of an image to be stored together with the image.

For example, the communication device acquires vital information such as the user's pulse rate and shoots an image based on the acquired vital information. The communication device generates additional information representing the user's emotion when the image is shot based on the acquired vital information. Then, the communication device causes the shot image and the generated additional information to be stored in a server device in association with each other so as to store the emotion when the image is shot.

Patent document 1: Japanese Patent Application Laid-open No. 2005-303734

However, in the technique of the related art, when a plurality of shooting targets are shown in a shot image, it is difficult to specify a shooting target related to an emotion represented by the additional information.

SUMMARY OF THE INVENTION

It is an object of the present invention to at least partially solve the problems in the conventional technology.

According to one aspect of an embodiment of the present invention, an information processing device includes an acquiring unit that acquires target information representing a shooting target shown in an image shot by a user and biological information acquired from the user when the image is shot for each plurality of images shot by the user. The information processing device includes an extracting unit that extracts biological information corresponding to target information representing the shooting target from the biological information acquired by the acquiring unit for each shooting target. The information processing device includes a specifying unit that specifies the user's emotion for the shooting target using the biological information extracted by the extracting unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram for describing an exemplary target information database according to an embodiment;

FIG. 6 is a diagram for describing an exemplary emotional information management table according to an embodiment;

FIG. 8 is a diagram for describing an example of a specifying result received from a specifying unit by an extracting unit according to an embodiment;

FIG. 9 is a diagram for describing an example in which noise is deleted from a target information database according to an embodiment;

FIG. 10 is a first diagram for describing an example of emotional information specified by a specifying unit according to an embodiment after noise removal;

FIG. 11 is a diagram for describing a variation of information stored in a target information database according to an embodiment;

FIG. 12 is a second diagram for describing an example of emotional information specified by a specifying unit according to an embodiment after noise removal;

DETAILED DESCRIPTION OF THE PREFERRED EMBODIMENTS

Figure 1:
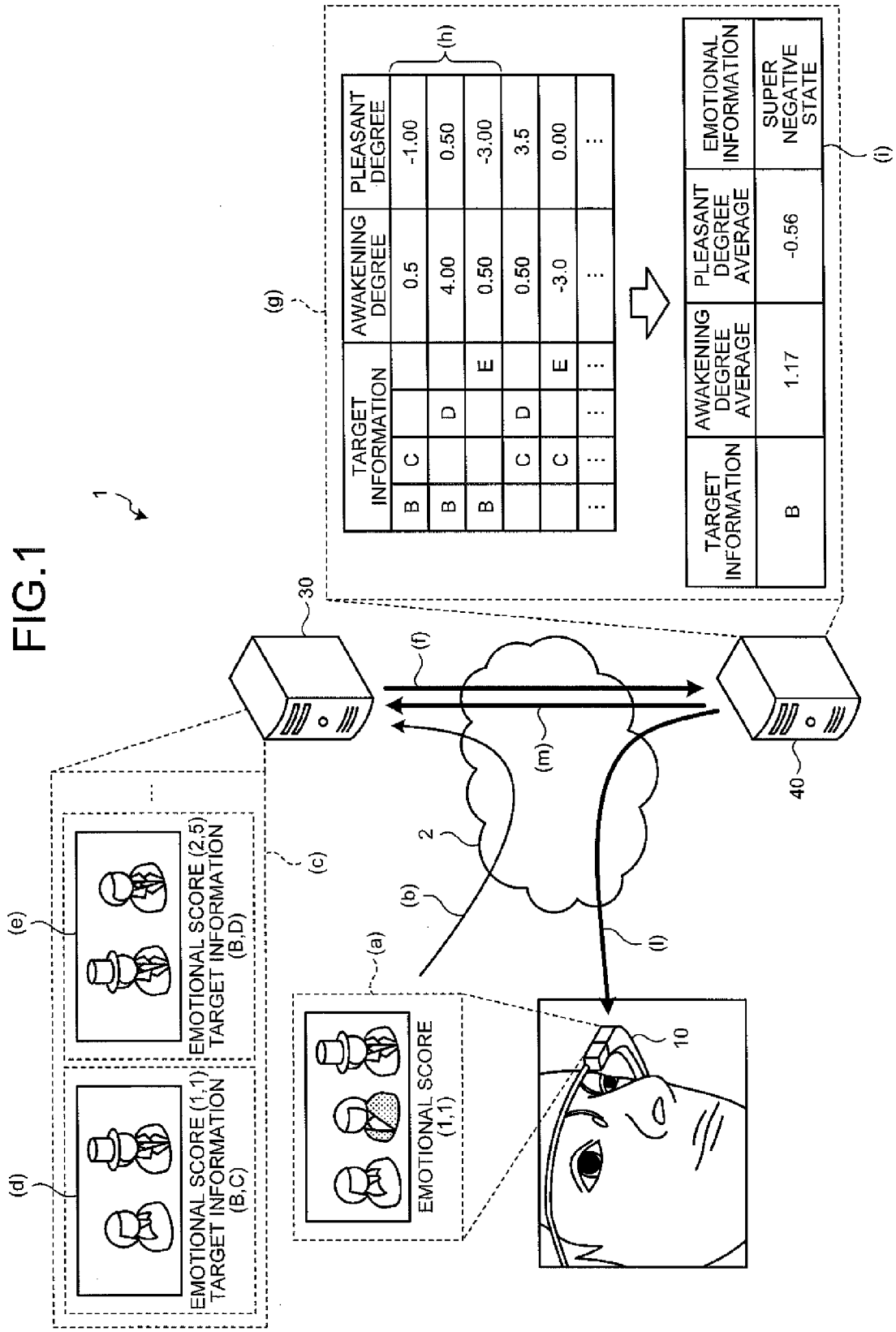
FIG. 1 is a diagram illustrating an exemplary function of an information providing system according to an embodiment.

Hereinafter, modes (hereinafter, referred to as "embodiments") for carrying out an information processing device, a specifying method, and a recording medium according to the present application will be described in detail with reference to the accompanying drawings. Further, an information processing device, a specifying method, and a recording medium according to the present application are not limited by the following embodiments. In the following embodiments, the same parts are denoted by the same reference numerals, and thus a redundant description will not be repeated.

1. Information Providing System

First of all, an information processing device, a specifying method, and an exemplary process performed by an information providing system 1 according to a specifying program recorded in a recording medium according to the present application will be described with reference to FIG. 1. FIG. 1 is a diagram illustrating an exemplary function of an information providing system according to an embodiment. In an example illustrated in FIG. 1, the information providing system 1 is configured such that a head mount device 10, a social network server 30, and an emotion determining server 40 are connected to one another via a network 2. Besides, the information providing system 1 may include a plurality of other head mount devices. In the following description, the head mount device 10 is assumed to be worn by a user #1.

The head mount device 10 is a wearable device that acquires biological information from the user. For example, the head mount device 10 is a glasses-type device. The head mount device 10 can display arbitrary information within the user #1's field of view. The head mount device 10 includes a camera and so can shoot a scene which the user #1 captures within his/her field of view.

The head mount device 10 includes a biosensor installed in a temple put on an ear, and can acquire various biosensor values such as a heart rate, a pulse, a body temperature, a myoelectric change, an electro-dermal activity (EDA), a voice, a walking distance, and a walking time of the user #1 from the user. The head mount device 10 can be connected to the network 2 via a wireless communication network of 3rd generation (3G), 4th generation (4G), long term evolution (LTE), global system for mobile communications (GSM), or the like. For example, a device such as Google Glass (a registered trademark) is considered as an example of the head mount device 10.

The head mount device 10 may be connected with a terminal device (not illustrated) such as a mobile telephone using near field communication such as Bluetooth (a registered trademark) or a wireless local area network (LAN), and may be connected to the network 2 through the connected terminal device. Further, the head mount device 10 may be worn on the user #1's wrist and acquire a biosensor value from the user #1 through a biological information acquiring device that acquires various biosensor values from the user #1.

The head mount device 10 may be implemented by a combination of a plurality of devices as long as the same function is implemented. For example, the head mount device 10 may be implemented by a combination of a biological information acquiring device that collects a biosensor value from the user and a terminal device that performs near field communication with the biological information acquiring device and acquires the acquired biosensor value. Unlike the head mount device 10, the terminal device may not have a function of displaying an image within the user's field of view, and preferably includes a screen on which arbitrary information is displayed.

Here, the head mount device 10 performs the following process. First, the head mount device 10 shoots a scene which the user #1 captures within his/her field of view according to an operation from the user #1, and acquires the user's biosensor value when an image is shot. The head mount device 10 generates an awakening degree and a pleasant degree of the user based on the acquired biosensor value. Then, the head mount device 10 allocates a set of the generated awakening degree and the pleasant degree to an image as an emotional score, and transmits the image to the social network server 30 via the network 2.

For example, the head mount device 10 stores the acquired emotional score in a property of the image, and then transmits the image to the social network server 30. Alternatively, the head mount device 10 may transmit the image to the social network server 30 in association with the emotional score without storing the emotional score in the property of the image.

For example, the social network server 30 has a function of a microblog in which an image submitted from each user is open to the public in the form of a bulletin board or a function of opening data such as text or an image submitted by each user to other users. In other words, the social network server 30 is a server that provides an arbitrary social networking service (SNS) in which transmission and reception of data are performed among arbitrary users. Concrete examples of such the SNS include Yahoo blog (a registered trademark), Facebook (a registered trademark), and Myspace (a registered trademark).

Here, the social network server 30 allocates target information representing a shooting target shot in an image submitted by each user to an image according to an operation from the user. For example, when an input request of a shooting target is received from an arbitrary terminal device of the user, the social network server 30 provides a selection screen of an image submitted by the user to the terminal device of the user.

In this case, the user selects an image to which information of a shooting target is to be input and inputs information of a shooting target shown in the selected image through the terminal device. For example, as an example of target information representing a shooting target such as a person, a landscape, or an object shown in the selected image, the user inputs a user ID (identifier) identifying a person shown in the selected image.

For example, the user inputs a user ID "A" when a person shown in the selected image is the user #1, and inputs a user ID "B" when a person shown in the selected image is a user #2. Further, for example, the user inputs a user ID "C" when a person shown in the selected image is a user #3, inputs a user ID "D" when a person shown in the selected image is a user #4, and inputs a user ID "E" when a person shown in the selected image is a user #5. Thereafter, the terminal device transmits the target information input by the user to the social network server 30.

Meanwhile, the social network server 30 allocates the received target information to the image selected by the user. For example, the social network server 30 stores the received used ID in the property of the image selected by the user. In the social network server 30, a process of storing the target information in the property of the image is an example of a process of managing an image and target information in association with each other, and any technique can be applied as long as an image can be associated with target information.

The emotion determining server 40 determines a photographer's emotion for a shooting target using target information representing a shooting target shown in a shot image and an emotional score acquired from the photographer when an image is shot. For example, the emotion determining server 40 acquires a plurality of images acquired by the user #1 from the social network server 30. Then, the emotion determining server 40 determines the user #1's emotion on each piece of target information using the target information and the emotional score included in the acquired image.

Here, there are cases in which an image shot by the user includes a plurality of shooting targets. For example, there are cases in which an image shot by the user #1 includes a plurality of users, for example, the user #2 and the user #3. In this case, in the technique of the related art, it is difficult to determine the user #1's emotion on each user based on only the emotional score acquired from the user #1 when an image is shot.

In this regard, the emotion determining server 40 performs the following process. First, the emotion determining server 40 acquires the target information and the emotional score stored in the property of each image received from the social network server 30. Then, the emotion determining server 40 extracts the emotional scores from all images to which a user ID of a shooting target serving as a determination target is allocated.

Then, the emotion determining server 40 determines the user's emotion for the shooting target serving as the determination target using the extracted emotional score. For example, the emotion determining server 40 calculates an average value of the emotional scores extracted from all images to which a user ID of a shooting target serving as a determination target is allocated. Then, the emotion determining server 40 determines the user's emotion for the shooting target based on the calculated average value of the emotional scores.

Specifically, the emotion determining server 40 extracts a set of the awakening degree and the pleasant degree from all images to which the user ID of the shooting target serving as the determination target is allocated, and calculates an average value of the extracted awakening degrees and an average value of the extracted pleasant degrees. Then, the emotion determining server 40 determines any one of an "excited state," a "delight state," a "relaxed state," a "bored state," a "depressed state," a "sad state," a "panic state," and an "angry state" as the user's emotion using the calculated awakening degree average value and the pleasant degree average value.

In other words, the emotion determining server 40 specifies all images in which the shooting target serving as the determination target is shown among images shot by the user, and determines the user's emotion for the shooting target using the average value of the emotional scores acquired from the user when the specified image is shot. Thus, even when a plurality of shooting targets are shown in the image shot by the user, the emotion determining server 40 can determine the user's emotion for each shooting target.

Further, the emotion determining server 40 can determine the user's emotion for an arbitrary shooting target other than a person. In other words, even when target information representing a shooting place or the like is allocated to the image shot by the user, the emotion determining server 40 can determine the user's emotion for the shooting place or the like by extracting an emotional score from an image to which the same target information is allocated and determining the user's emotion using the average value of the extracted emotional scores.

Further, the emotion determining server 40 can determine the user's emotion using any technique as long as it is possible to extract an emotional score from an image to which target information of a shooting target serving as a determination target is allocated and determine the user's emotion using the extracted emotional score. For example, the emotion determining server 40 may determine the user's emotion in view of an emotional score serving as noise from an emotional score allocated to an image received from the social network server 30.

For example, when the user #2 for whom the user #1 has a strong negative emotion and the user #3 for whom the user #1 has an average emotion are shown in an image shot by the user #1, an emotional score representing that the user has a negative emotion is allocated to the image. In this case, the user #1's emotion for the user #3 is drawn to the user #1's emotion for the user #2, the user #1's emotion is likely to be determined as being a negative emotion.

In this regard, the emotion determining server 40 performs the following process. First, the emotion determining server 40 extracts an emotional score allocated to an image to which the same target information is allocated for each piece of target information, and determines the user's emotion for each shooting target using an average value of the extracted emotional scores. Then, the emotion determining server 40 specifies a shooting target for which the user's emotion is determined as satisfying a predetermined condition, for example, a shooting target for which the user has a strong negative emotion.

Next, the emotion determining server 40 selects target information and emotional scores acquired from an image in which the specified shooting target is not shown, and extracts an emotional score corresponding target information representing a shooting target serving as a determination target among the selected emotional scores. Then, the emotion determining server 40 specifies the user's emotion for the shooting target using an average value of the extracted emotional scores.

In other words, the emotion determining server 40 excludes an emotional score extracted from an image in which a shooting target for which the user has a strong negative emotion is shown, and determines the user's emotion for each shooting target. As a result, even when a shooting target for which the user has a strong negative emotion is included in the image shot by the user, the emotion determining server 40 can appropriately determine the user's emotion for the other shooting targets. Further, the emotion determining server 40 may exclude an emotional score extracted from an image in which a shooting target for which the user has a strong positive emotion is shown and determine the user's emotion for each shooting target.

Here, for example, a shooting target for which the user has a strong positive emotion is a shooting target for which the user has an emotion included in the "super positive state" such as the "excited state" or the "delight state." Further, a shooting target for which the user has a positive emotion is a shooting target for which the user has an emotion included in the "positive state" such as the "relaxed state" or the "delight state." Further, a shooting target for which the user has a negative emotion is a shooting target for which the user has an emotion included in the "negative state" such as the "bored state," the "depressed state," or the "sad state." Further, a shooting target for which the user has a strong negative emotion is a shooting target for which the user has an emotion included in the "super negative state" such as the "panic state" or the "angry state."

As another example, the emotion determining server 40 determines the user's emotion when the user shoots each image, that is, the user's emotion for each image using each acquired emotional score individually. Further, the emotion determining server 40 counts the number of times that a shooting target is shown in an image in which the user's emotion is determined as satisfying a predetermined condition for each shooting target. For example, the emotion determining server 40 counts the number of pieces of target information acquired from an image in which the user's emotion is determined as satisfying a predetermined condition for each shooting target. Then, the emotion determining server 40 may specify a shooting target in which the counted number is larger than a predetermined threshold value, exclude an emotional score acquired from an image in which the specified shooting target is shown, and specify the user's emotion for each shooting target.

For example, the emotion determining server 40 acquires a set of target information representing a shooting target shown in an image shot by the user and an emotional score collected from the user when the image is shot. Further, the emotion determining server 40 determines whether the user's emotion satisfies a predetermined condition using an emotional score included in each set individually for each acquired set. Further, the emotion determining server 40 counts the number of pieces of target information included in the set determined as satisfying a predetermined condition for each piece of target information, and specifies target information in which the counted number is larger than a predetermined threshold value. Then, the emotion determining server 40 may erase a set including the specified target information from the set of the stored target information and the emotional score and specify the user's emotion for each shooting target using the remaining emotional scores.

Next, the flow of a process performed by the emotion determining server 40 in the information providing system 1 will be described. In the following example, the description will be made in connection with a process in which the emotion determining server 40 determines the user #1's emotion for the user #2 using an average value of the emotional scores allocated to a photograph in which the user #2 is shown. In the following description, the head mount device 10 is assumed to allocate an emotional score represented by a format (awakening degree or pleasant degree) from the user to an image.

First of all, the head mount device 10 allocates an emotional score (1, 1) when the user #1 shoots an image to the image shot by the user #1 as illustrated in (a) of FIG. 1. Then, the head mount device 10 transmits the image including the emotional score allocated thereto to the social network server 30 via the network 2 as illustrated in (b) of FIG. 1. In this case, the social network server 30 opens each image received from the user #1 to the public as illustrated in (c) of FIG. 1.

Here, the social network server 30 allocates target information representing a shooting target to each image according to an operation from the user #1 or any other user. For example, the social network server 30 allocates the user ID "B" representing the user #2 and the user ID "C" representing the user #3 to an image in which the user #2 and the user #3 are shown as illustrated in (d) of FIG. 1. Further, the social network server 30 allocates the user ID "B" representing the user #2 and the user ID "D" representing the user #4 to an image in which the user #2 and the user #4 are shown as illustrated in (e) of FIG. 1.

Meanwhile, the emotion determining server 40 acquires each image shot by the user #1 from the social network server 30 at a predetermined timing as illustrated in (f) of FIG. 1. Then, the emotion determining server 40 extracts target information and an emotional score from each image as illustrated in (g) of FIG. 1.

Further, the emotion determining server 40 extracts emotional scores corresponding to the target information "B" of the user #2 serving as the determination target, that is, emotional scores allocated to the image to which the target information "B" is allocated, and calculates an average value of the extracted emotional scores as illustrated in (h) of FIG. 1. The emotion determining server 40 determines the user #1's emotion for the user #2 using the calculated average value. For example, the emotion determining server 40 determines that the user #1's emotion for the user #2 is the "super negative state" as illustrated in (i) of FIG. 1.

Thereafter, for example, the emotion determining server 40 notifies the user #1 of the user #1's emotion for the user #2 as illustrated in (1) of FIG. 1. Thus, even when a plurality of shooting targets are shown in the image shot by the user, the emotion determining server 40 can cause the user #1 to identify an individual emotion for each shooting target.

The emotion determining server 40 may perform various processes in addition to the process of notifying of the user's emotion. For example, the emotion determining server 40 may store the user's emotion for each shooting target. Then, when the terminal device (for example, the head mount device 10) of the user acquires an image from the social network server 30, the emotion determining server 40 may acquire target information allocated to the image and specify the user's emotion for a shooting target represented by the acquired target information. Then, the emotion determining server 40 may transmit emotional information representing the specified emotion to the terminal device and cause an emotion represented by the emotional information to be displayed on the terminal device.

Further, the emotion determining server 40 may perform the same process on a user other than the user #1 and perform a process according to mutual emotions between users. For example, the emotion determining server 40 may provide information of the user #2 to the user #3 when the user #2 has an emotion of the "super positive state" for the user #3, and the user #3 has an emotion of the "positive state" for the user #2.

Further, the emotion determining server 40 may notify the social network server 30 of the user's emotion as illustrated in (m) of FIG. 1 and limit disclosure of data such as text or a photograph submitted by the user according to the notified emotion. For example, when the user #1 has an emotion of the "super negative state" for the user #2, the emotion determining server 40 may instruct the social network server 30 not to open the data submitted by the user #1 to the user #2.

As described above, the emotion determining server 40 can perform an arbitrary process according to the determined emotion. The following description will be described in connection with an example in which the emotion determining server 40 notifies the head mount device 10 of an emotion of the user #1 wearing the head mount device 10.

2. Functional Configuration of Head Mount Device

Figure 2:
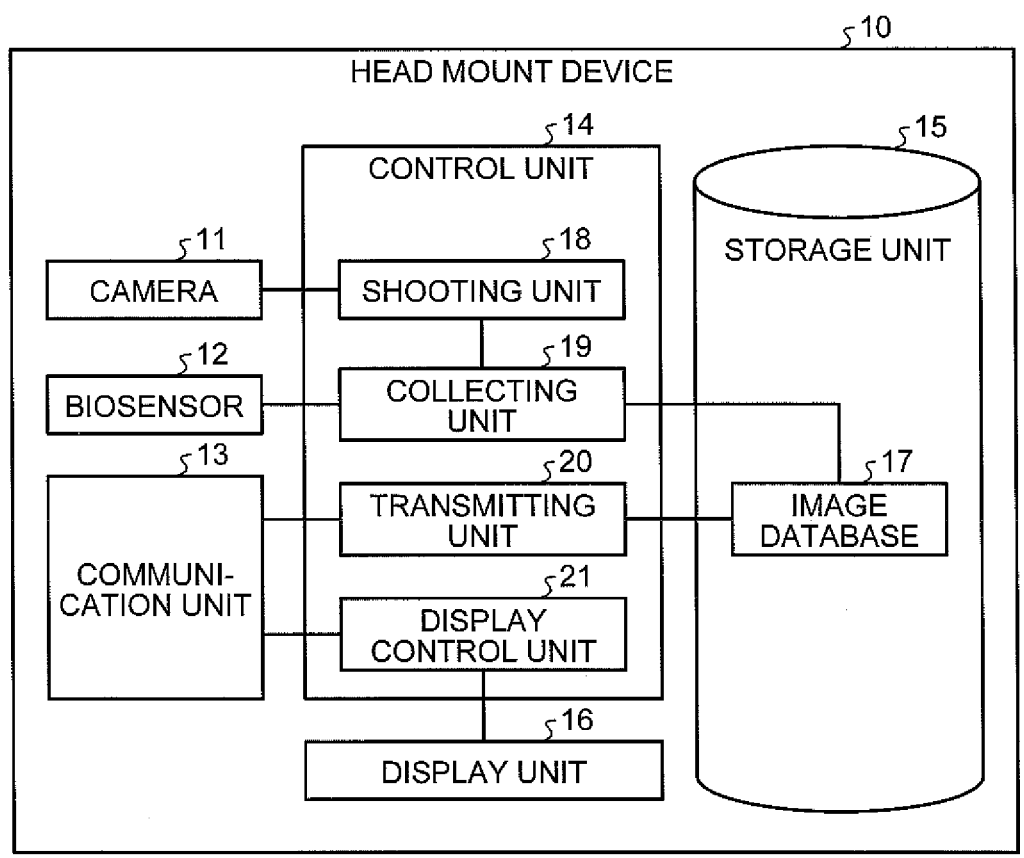
FIG. 2 is a diagram for describing an exemplary functional configuration of a head mount device according to an embodiment.

Next, a functional configuration of the head mount device 10 according to an embodiment will be described with reference to FIG. 2. FIG. 2 is a diagram for describing an exemplary functional configuration of a head mount device according to an embodiment. In the example illustrated in FIG. 2, the head mount device 10 includes a camera 11, a biosensor 12, a communication unit 13, a control unit 14, a storage unit 15, and a display unit 16. The storage unit 15 includes an image database 17. The control unit 14 includes a shooting unit 18, a collecting unit 19, a transmitting unit 20, and a display control unit 21.

First of all, the image database 17 equipped in the storage unit 15 will be described. The image database 17 temporarily stores an image shot by the user. For example, the image database 17 stores an image shot by the user #1 using the head mount device 10. Here, the image stored in the image database 17 is allocated biological information when the image is shot by the user #1 as the property.

The camera 11 is an image acquiring device that acquires an image. For example, the camera 11 is an image acquiring device installed adjacent to the user's eye, and acquires an image of the user wearing the head mount device 10 using a charge coupled device (CCD) image sensor or a complementary metal-oxide semiconductor (CMOS) image sensor.

The biosensor 12 is a sensor that acquires a biosensor value from the user. For example, the biosensor 12 acquires one or more biosensor values from the user. Then, the biosensor 12 generates an emotional score obtained by evaluating an awakening degree and a pleasant degree in 10 steps of −5 to 5 based on the acquired biosensor values.

The communication unit 13 controls communications with the head mount device 10, the social network server 30, and the emotion determining server 40. Specifically, when an image notification including an image to be transmitted to the social network server 30 and a user ID representing a user who has shot the image is received from the transmitting unit 20, the communication unit 13 transmits the received image notification to the social network server 30 via the network 2.

Further, when an emotional information notification including target information and emotional information representing an emotion of the user of the head mount device 10 is received from the emotion determining server 40, the communication unit 13 outputs the received emotional information notification to the display control unit 21.

The display unit 16 is a display device capable of displaying arbitrary information within the user's field of view. For example, the display unit 16 performs a display of information within the user's field of view by inputting an image to a sculptured surface prism installed on the user's line of sight. For example, the display unit 16 displays information representing a shooting target and the user's emotion for the shooting target according to control of the display control unit 21. Further, for example, the display unit 16 displays an image and also displays information of each shooting target shown in the image and the user's emotion for each shooting target.

The shooting unit 18 shoots an image at a timing instructed by the user. Specifically, the shooting unit 18 operates the camera 11 to acquire an image when the user gives an image shooting instruction. Then, the shooting unit 18 outputs the shot image to the collecting unit 19.

The collecting unit 19 collects the image shot by the user and an emotional score when the image is shot by the user. For example, the collecting unit 19 operates the biosensor 12 to acquire an emotional score when the user gives an image shooting instruction. Then, the collecting unit 19 allocates the collected emotional score to the image received from the shooting unit 18. Thereafter, the collecting unit 19 causes the image including the emotional score allocated thereto to be stored in the image database 17.

The transmitting unit 20 reads an image to be transmitted to the social network server 30 and transmits the read image. For example, when the user selects a photograph to be opened to other users from the image database 17, the transmitting unit 20 reads the image selected by the user from the image database 17. Then, the transmitting unit 20 outputs an image notification including the read image and the user ID of the user of the head mount device 10 to the communication unit 13. As a result, the image shot by the user is transmitted to the social network server 30 via the network 2.

When emotional information is received from the emotion determining server 40, the display control unit 21 causes the received emotional information to be displayed on the display unit 16. For example, when an emotional information notification is received from the emotion determining server 40, the display control unit 21 extracts target information and emotional information from the received emotional information notification. Then, the display control unit 21 causes information representing that the user of the head mount device 10 has an emotion represented by the extracted emotional information for a shooting target represented by the extracted target information to be displayed on the display unit 16.

Further, the display control unit 21 may cause the target information and the emotional information extracted from the emotional information notification to be stored in the storage unit 15 in association with each other. Further, the display control unit 21 may acquire an image including target information allocated thereto from the social network server 30 according to the user's request.

Further, the display control unit 21 extracts target information allocated to the acquired image, and acquires emotional information associated with the extracted target information from the storage unit 15. Then, the display control unit 21 causes information representing that the user has an emotion represented by the emotional information acquired from the storage unit 15 for the shooting target represented by the target information extracted from the image to be displayed on the display unit 16 together with the acquired image. As this process is performed, even when a plurality of shooting targets are shown in the image shot by the user, the head mount device 10 can display an individual emotion for each shooting target.

3. Functional Configuration of Social Network Server

Figure 3:
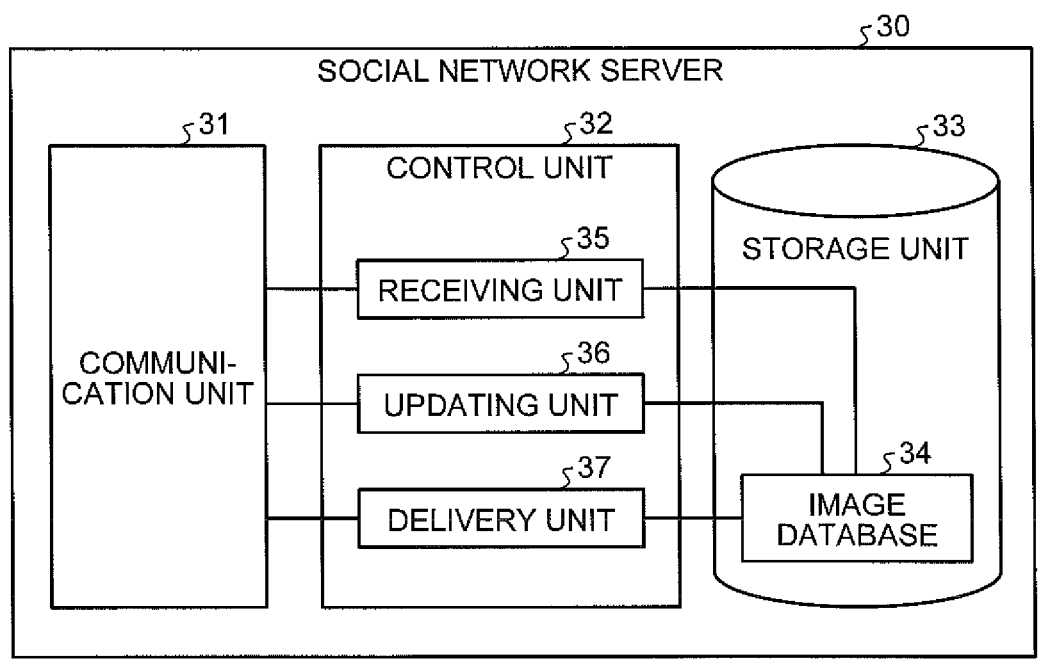
FIG. 3 is a diagram for describing an exemplary functional configuration of a social network server according to an embodiment.

Next, a functional configuration of the social network server 30 according to an embodiment will be described with reference to FIG. 3. FIG. 3 is a diagram for describing an exemplary functional configuration of a social network server according to an embodiment. In the example illustrated in FIG. 3, the social network server 30 includes a communication unit 31, a control unit 32, and a storage unit 33. The storage unit 33 includes an image database 34. The control unit 32 includes a receiving unit 35, an updating unit 36, and a delivery unit 37.

First of all, an example of information stored in the image database 34 by the storage unit 33 will be described. The image database 34 is a database in which images shot by the user are stored. For example, the user ID of each user and an image shot by the user represented by the corresponding user ID are stored in the image database 34 in association with each other.

The communication unit 31 controls communications with the social network server 30, the head mount device 10, and the emotion determining server 40. For example, when an image notification is received from the head mount device 10, the communication unit 31 outputs the received image notification to the receiving unit 35. Further, when an allocation notification including image identification information and target information is received from an arbitrary terminal device, the communication unit 31 outputs the received allocation notification to the updating unit 36.

Further, when a delivery request including image identification information representing an image serving as a delivery target and information representing a request source is received, the communication unit 31 outputs the received delivery request to the delivery unit 37. Further, when an image and information representing a transmission destination of the image are received from the delivery unit 37, the communication unit 31 transmits the received image to a transmission destination represented by the notification. In other words, the communication unit 31 transmits an image received from the delivery unit 37 to a transmission source of the delivery request for requesting transmission of the image.

The receiving unit 35 receives the image shot by the user and causes the received image to be stored in the image database 34. Specifically, the receiving unit 35 receives an image notification including the user ID representing the user and an image shot by the user represented by the user ID from the communication unit 31. In this case, the receiving unit 35 extracts the user ID and the image from the received image notification, and allocates image identification information identifying the image to the extracted image. Then, the receiving unit 35 causes the user ID and the image to be stored in the image database 34 in association with each other.

The updating unit 36 allocates target information representing a shooting target shown in each image to each image stored in the image database 34. For example, when an allocation notification is received from the communication unit 13, the updating unit 36 extracts image identification information and target information from the received allocation notification. Next, the updating unit 36 searches for an image represented by the extracted image identification information with reference to the image database 34. Then, the updating unit 36 allocates the target information extracted from the allocation notification to the searched image. For example, when the user IDs "B," "C," and "D" are extracted from the allocation notification, the updating unit 36 stores the user IDs "B," "C," and "D" in the property of the searched image.

The delivery unit 37 delivers an image submitted from the user to the social network server 30. For example, when a delivery request is received from the communication unit 31, the delivery unit 37 extracts image identification information and information representing a request source from the received delivery request. Then, the delivery unit 37 reads an image represented by the extracted image identification information from the image database 34, and outputs information representing the request source read from the delivery request and the image to the communication unit 31. Further, the delivery unit 37 outputs information representing the extracted request source to the communication unit 31 as information representing a transmission destination of an image.

Further, the delivery unit 37 receives a delivery request including the user ID as the image identification information from the emotion determining server 40. In this case, the delivery unit 37 delivers all images associated with the user ID stored in the delivery request to the emotion determining server 40.

4. Functional Configuration of Emotion Determining Server

Figure 4:
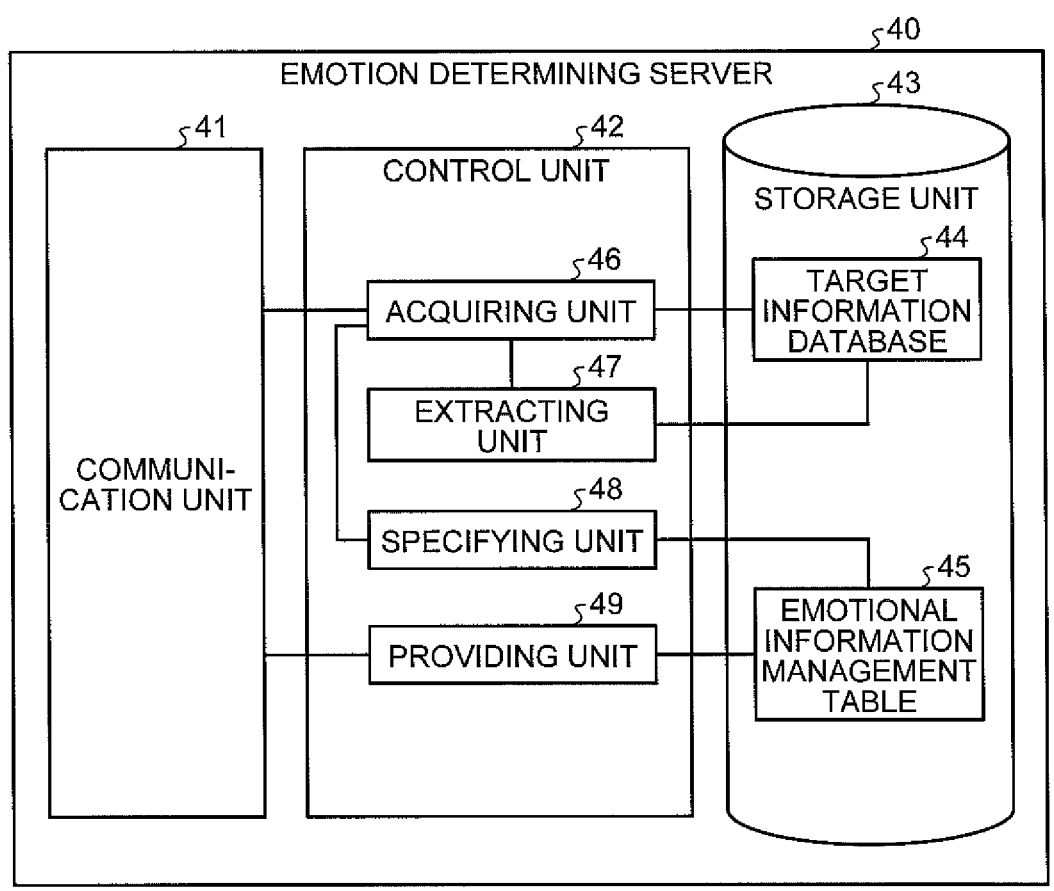
FIG. 4 is a diagram for describing an exemplary functional configuration of an emotion determining server according to an embodiment.

Next, a functional configuration of the emotion determining server 40 according to an embodiment will be described with reference to FIG. 4. FIG. 4 is a diagram for describing an exemplary functional configuration of an emotion determining server according to an embodiment. In the example illustrated in FIG. 4, the emotion determining server 40 includes a communication unit 41, a control unit 42, and a storage unit 43. The storage unit 43 stores a target information database 44 and an emotional information management table 45. The control unit 42 includes an acquiring unit 46, an extracting unit 47, a specifying unit 48, and a providing unit 49.

First of all, an example of information included in the target information database 44 and the emotional information management table 45 stored in the storage unit 43 will be described. The target information database 44 stores target information representing a shooting target shown in an image shot by a certain user and an emotional score collected from the user when the image is shot in association with each other.

For example, FIG. 5 is a diagram for describing an exemplary target information database according to an embodiment. In the example illustrated in FIG. 5, the target information database 44 stores target information representing a shooting target shown in an image shot by the user #1 and an emotional score collected from the user #1 when the image is shot in association with each other.

The target information database 44 stores target information, an awakening degree, and a pleasant degree for each image in association with one another as illustrated in FIG. 5. For example, the target information database 44 stores the target information "B" and "C," the awakening degree "0.50," and the pleasant degree "−1.00" in association with one another. In other words, when an image in which the user #2 and the user #3 are shown is shot by the user #1, the target information database 44 represents that the awakening degree "0.50" and the pleasant degree "−1.00" are acquired from the user #1 as the emotional score.

Further, in the target information database 44, the target information "B" and "D," the awakening degree "4.0," and the pleasant degree "0.50" are stored in association with one another, the target information "B" and "E," the awakening degree "0.50," and the pleasant degree "−3.00" are stored in association with one another, and the target information "C" and "D," the awakening degree "0.50," and the pleasant degree "3.50" are stored in association with one another. Further, in the target information database 44, the target information "C" and "E," the awakening degree "−3.0," and the pleasant degree "0.00" are stored in association with one another, the target information "D" and "E," the awakening degree "0.50," and the pleasant degree "1.50" are stored in association with one another, and the target information "B," "C," and "D," the awakening degree "1.67," and the pleasant degree "1.00" are stored in association with one another.

Further, in the target information database 44, the target information "B," "C," and "E," the awakening degree "−0.67," and the pleasant degree "−1.33" are stored in association with one another, the target information "B," "D," and "E," the awakening degree "1.67," and the pleasant degree "−0.33" are stored in association with one another, and the target information "C," "D," and "E," the awakening degree "−0.67," and the pleasant degree "1.67" are stored in association with one another. Further, in the target information database 44, the target information "B," "C," "D," and "E," the awakening degree "0.50," and the pleasant degree "0.25" are stored in association with one another, the target information "B" and "D," the awakening degree "3.00," and the pleasant degree "1.08" are stored in association with one another, and the target information "C," "D," and "E," the awakening degree "2.00," and the pleasant degree "1.55" are stored in association with one another. Further, in the target information database 44, the target information "D" and "E," the awakening degree "2.02," and the pleasant degree "3.52" are stored in association with one another, and the target information "B" and "E," the awakening degree "3.06," and the pleasant degree "−1.02" are stored in association with one another.

Returning to FIG. 4, the description is continued. The emotional information management table 45 stores an emotion of each user for a shooting target. For example, FIG. 6 is a diagram for describing an exemplary emotional information management table according to an embodiment. In the example illustrated in FIG. 6, the emotional information management table 45 stores the user ID as an example of target information. The emotional information management table 45 stores the user ID representing the user having an emotion, target information which is the user ID of the user serving as a target of an emotion, and emotional information representing an emotion in association with one another as illustrated in FIG. 6.

For example, in the example illustrated in FIG. 6, in the emotional information management table 45, the user ID "A," the target information "B," and the emotional information "super negative state" are stored in association with one another, and the user ID "A," the target information "C," and the emotional information "positive state" are stored in association with one another. Further, in the emotional information management table 45, the user ID "A," the target information "D," and the emotional information "super positive state" are stored in association with one another, and the user ID "A," the target information "E," and the emotional information "positive state" are stored in association with one another.

In other words, in the example illustrated in FIG. 6, the emotional information management table 45 represents that the user #1's emotion for the user #2 is the "super negative state," and the user #1's emotion for the user #3 is the "positive state." Further, the emotional information management table 45 represents that the user #1's emotion for the user #4 is the "super positive state," and the user #1's emotion for the user #5 is the "positive state."

Returning to FIG. 4, the description is continued. The communication unit 41 controls communications with the emotion determining server 40, the head mount device 10, and the social network server 30. For example, when a delivery request is received from the acquiring unit 46, the communication unit 41 transmits the received delivery request to the social network server 30. Further, when an image is received from the social network server 30, the communication unit 41 outputs the received image to the acquiring unit 46. Further, when an emotional information notification and a notification of a transmission destination are received from the providing unit 49, the communication unit 41 transmits the received emotional information notification to the notified transmission destination (for example, the head mount device 10).

The acquiring unit 46 acquires target information representing a shooting target shown in an image shot by the user and an emotional score, collected from the user when the image is shot, from the image. For example, when an instruction of a user to specify an emotion is received from the specifying unit, the acquiring unit 46 generates a delivery request including the user ID of the instructed user, and outputs the generated delivery request to the communication unit 41.

Further, when an image shot by the user representing the user ID included in the delivery request is received from the communication unit 41 as a result of outputting the delivery request, the acquiring unit 46 extracts target information and an emotional score from the property of the received image. Then, the acquiring unit 46 causes the extracted target information and the emotional score to be stored in the target information database 44 in association with each other. Specifically, the acquiring unit 46 causes one or more pieces of target information, awakening degrees, and pleasant degrees extracted from a single image to be stored in the same entry of the target information database 44 in association with one another. Thereafter, the acquiring unit 46 gives a process execution instruction to the extracting unit 47.

The extracting unit 47 extracts an emotional score corresponding to target information representing a shooting target from the target information database 44 for each shooting target. For example, when the process execution instruction is received from the acquiring unit 46, the extracting unit 47 specifies an entry in which the target information "B" is stored among from the entries of the target information database 44. Then, the extracting unit 47 extracts each awakening degree and each pleasant degree included in the specified entry, and outputs the extracted awakening degree and pleasant degree to the specifying unit 48. Further, the extracting unit 47 notifies the specifying unit 48 of the user ID "A" of the user having an emotion and the target information "B" serving as the determination target.

Further, for example, the extracting unit 47 performs the same process on each of the target information "C," "D," and "E," and extracts an emotional score, collected from the user when an image having each shooting target therein is shot, for each shooting target. Then, the extracting unit 47 outputs the extracted emotional score to the specifying unit 48.

The specifying unit 48 specifies the user's emotion for each shooting target using an emotional score which is extracted for each shooting target through the extracting unit 47. Specifically, the specifying unit 48 receives a plurality of awakening degrees and a plurality of pleasant degrees which are extracted from the target information database 44 for each shooting target through the extracting unit 47. In this case, the specifying unit 48 calculates an average value of the plurality of received awakening degrees and an average value of the plurality of received pleasant degrees. Then, the specifying unit 48 specifies the user's emotion for the shooting target using the calculated average value of the awakening degrees and the average value of the pleasant degrees.

For example, the specifying unit 48 receives the awakening degrees and the pleasant degrees illustrated in (A) of FIG. 5 among the emotional scores illustrated in FIG. 5, that is, the awakening degrees and the pleasant degrees of the entry in which "B" is included as the target information. In this case, the specifying unit 48 calculates the average value "1.17" of the received awakening degrees and the average value "−0.56" of the received pleasant degrees. Then, the specifying unit 48 specifies the user #1's emotion for a shooting target represented by the target information "B", that is, the user #2, based on the calculated average value. Thereafter, the specifying unit 48 notifies the acquiring unit 46 of the user whose emotion is determined, for example, the user other than the user #1, and gives an instruction for acquiring the image shot by the notified user.

Figure 7:
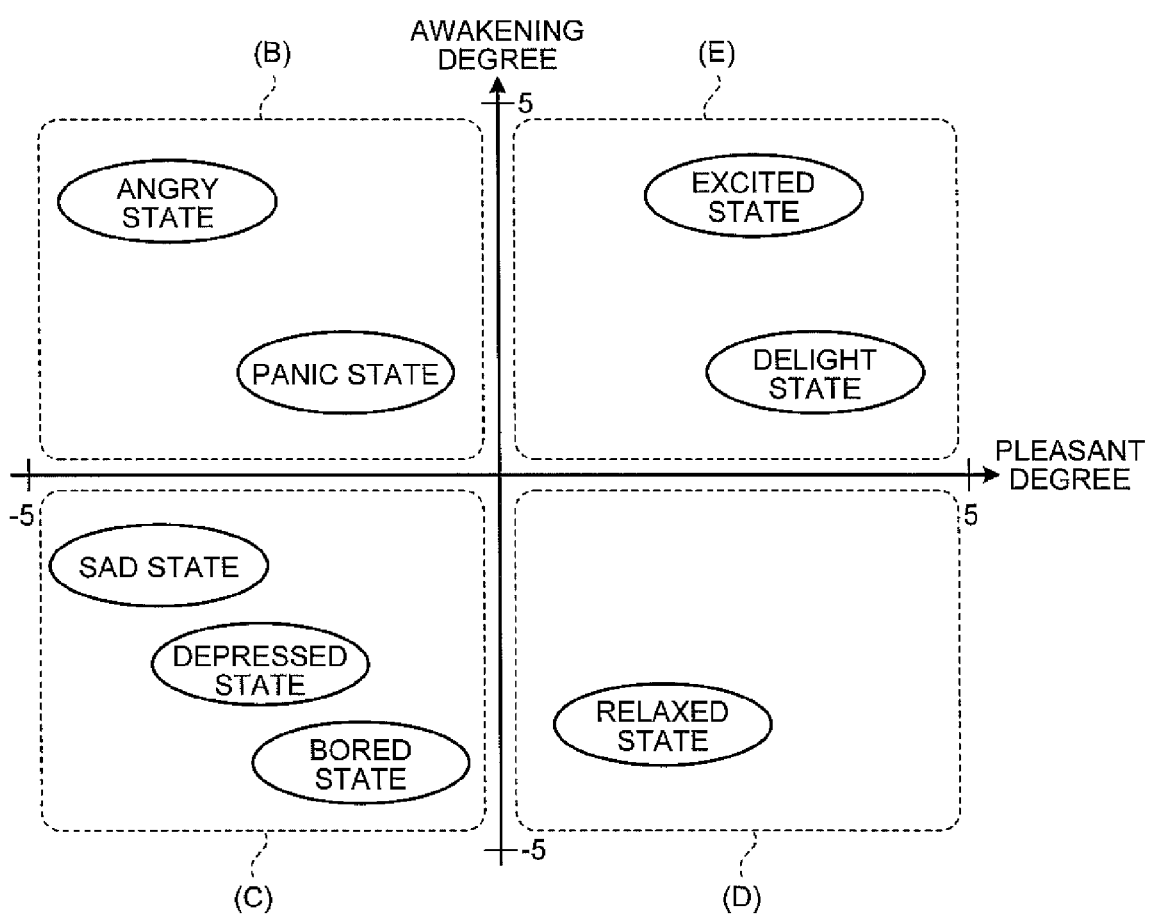
FIG. 7 is a diagram for describing an example of a process of determining a user's emotion through an emotion determining server according to an embodiment.

Here, an example of a process in which the specifying unit 48 determines the user's emotion will be described with reference to FIG. 7. FIG. 7 is a diagram for describing an example of a process in which an emotion determining server according to an embodiment determines the user's emotion. FIG. 7 illustrates an example of a two-dimensional emotional model used when an emotion is determined based on an average value of the awakening degrees and an average value of the pleasant degrees of the user.

For example, when the awakening degree of the user has a positive value and the pleasant degree has a negative value, the specifying unit 48 determines that the user's emotion is in the "super negative state" such as the "angry state" or the "panic state" as illustrated in (B) of FIG. 7. Specifically, the specifying unit 48 determines that the user's emotion is in the "angry state" when the value of the awakening degree is within the range of about "3" and the value of the pleasant degree is within the range of about "−5 to −2," and determines that the user's emotion is in the "panic state" when the value of the awakening degree is within the range of about "1 to 3" and the value of the pleasant degree is within the range of about "−3 to 0."

Further, when the awakening degree of the user has a negative value and the pleasant degree has a negative value, the specifying unit 48 determines that the user's emotion is in the "negative state" such as the "sad state," the "depressed state," or the "bored state" as illustrated in (C) of FIG. 7. Specifically, the specifying unit 48 determines that the user's emotion is in the "sad state" when the value of awakening degree is within the range of about "−1 to 0" and the value of the pleasant degree is within the range of about "−5 to −2," determines that the user's emotion is in the "depressed state" when the value of awakening degree is within the range of about "−3 to −1" and the value of the pleasant degree is within the range of about "−3 to −1," and determines that the user's emotion is in the "bored state" when the value of awakening degree is within the range of about "−5 to −3" and the value of the pleasant degree is within the range of about "−3 to 0."

Further, when the awakening degree of the user has a negative value and the pleasant degree has a positive value, the specifying unit 48 determines that the user's emotion is in the "positive state" such as the "relaxed state" as illustrated in (D) of FIG. 7. Specifically, the specifying unit 48 determines that the user's emotion is in the "relaxed state" when the value of awakening degree is within the range of about "−4 to −3" and the value of the pleasant degree is within the range of about "0 to 3."

Further, when the awakening degree of the user has a positive value and the pleasant degree has a positive value, the specifying unit 48 determines that the user's emotion is in the "super positive state" such as the "excited state" or the "delight state" as illustrated in (E) of FIG. 7. Specifically, the specifying unit 48 determines that the user's emotion is in the "excited state" when the value of awakening degree is within the range of about "3 to 5" and the value of the pleasant degree is within the range of about "3 to 4," and determines that the user's emotion is in the "delight state" when the value of awakening degree is within the range of about "0 to 2" and the value of the pleasant degree is within the range of about "2 to 5."

Here, an example of a process performed by the specifying unit 48 will be described. For example, the specifying unit 48 calculates the average value "1.17" of the awakening degrees of the entries including "B" as the target information and the average value "−0.56" of the received pleasant degrees. As a result, the specifying unit 48 determines that the user #1's emotion for the user #2 is in the "super negative state" based on the calculated average value of the awakening degrees and the average value of the pleasant degrees. Then, the specifying unit 48 stores the emotional information "super negative state" representing the specified emotion in the emotional information management table 45 in association with the user ID "A" of the user having an emotion and the target information "B" which are notified from the extracting unit.

The providing unit 49 provides an emotion specified by the specifying unit 48. For example, the providing unit 49 extracts the target information and the emotional information associated with the user ID "A" of the user #1 from the emotional information management table 45, and generates an emotional information notification including the extracted target information and the emotional information. Then, the providing unit 49 outputs the generated emotional information notification to the communication unit 41, and notifies the communication unit 41 of the head mount device 10 of the user #1 represented by the user ID "A" as the transmission destination.

As described above, the emotion determining server 40 acquires target information representing a shooting target included in an image shot by the user and emotional scores collected from the user when the image is shot, extracts emotional scores corresponding to the same target information from the acquired emotional scores, and specifies the user's emotion for the shooting target based on the average value of the extracted emotional scores. Thus, even when a plurality of shooting targets are included in the image shot by the user, the emotion determining server 40 can individually specify the user's emotion for each shooting target.

5. First Variation of Process Performed by Emotion Determining Server

Next, a first variation of a process performed when the emotion determining server 40 specifies the user's emotion for each shooting target will be described. For example, the specifying unit 48 specifies the user's emotion for the shooting target represented by each piece of target information using the average value of the emotional scores corresponding to the target information representing the shooting target for each shooting target. Then, the specifying unit 48 notifies the extracting unit 47 of the user's emotion for each shooting target without storing the user's emotion for each shooting target in the emotional information management table 45.

In this case, the extracting unit 47 specifies a shooting target in which the user's emotion notified from the specifying unit 48 satisfies a predetermined condition. For example, the extracting unit 47 specifies a shooting target in which the notified user's emotion is in the "super negative state." Then, the extracting unit 47 deletes an entry including the target information representing the specified shooting target among the entries stored in the target information database 44. Thereafter, the extracting unit 47 specifies an entry including the target information representing the shooting target based on the target information database 44 for each shooting target, and outputs an emotional score included in the specified entry to the specifying unit 48.

Meanwhile, the specifying unit 48 calculates an average value of the emotional scores received again from the extracting unit 47, and specifies the user's emotion for each shooting target again using the calculated average value. Then, the specifying unit 48 stores the user's emotion that has been specified again in the emotional information management table 45.

For example, FIG. 8 is a diagram for describing an example of a specifying result received from the specifying unit by the extracting unit according to an embodiment. FIG. 8 illustrates the average value of the emotional scores acquired from the user #1 when the user #1 shoots an image including the users #2 to #E and the user #1's emotion specified based on the average value.

For example, the extracting unit 47 receives information representing that the user #1 has an emotion of the "super negative state" for the shooting target represented by the target information "B" since an awakening degree average is "1.17" and a pleasant degree average is "−0.56" as illustrated in FIG. 8. Further, the extracting unit 47 receives information representing that the user #1 has an emotion of the "positive state" for the shooting target represented by the target information "C" since an awakening degree average is "−0.17" and a pleasant degree average is "0.17."

Further, the extracting unit 47 receives information representing that the user #1 has an emotion of the "super positive state" for the shooting target represented by the target information "D" since an awakening degree average is "1.17" and a pleasant degree average is "0.35." Further, the extracting unit 47 receives information representing that the user #1 has an emotion of the "negative state" for the shooting target represented by the target information "E" since an awakening degree average is "−0.17" and a pleasant degree average is "−0.18."

In this case, the extracting unit 47 deletes the entry including the target information "B" among the entries stored in the target information database 44 as illustrated in (F) of FIG. 8. As a result, the target information database 44 stores target information and an emotional score illustrated in FIG. 9.

FIG. 9 is a diagram for describing an example in which noise is deleted from a target information database according to an embodiment. The extracting unit 47 deletes the entry including the target information "B" from the target information database 44 as illustrated in FIG. 9. Then, the extracting unit 47 extracts an emotional score associated with target information of a shooting target among the emotional scores illustrated in FIG. 9 for each shooting target, and outputs the extracted emotional score to the specifying unit 48. For example, the extracting unit 47 extracts the awakening degree and the pleasant degree associated with the target information "C" as illustrated in (G) of FIG. 9, and outputs the extracted awakening degree and the pleasant degree to the specifying unit 48.

Meanwhile, the specifying unit 48 determines the user #1's emotion for the shooting targets represented by the target information "C" to "E" again using the average value of the emotional scores extracted again by the extracting unit 47 as illustrated in FIG. 10. FIG. 10 is a first diagram for describing an example of emotional information specified by a specifying unit according to an embodiment after noise removal. The specifying unit 48 calculates an average value of emotional scores extracted again by the extracting unit 47, and specifies the user #1's emotion for each of the target information "C" to "E" based on the calculated average value as illustrated in FIG. 10.

As a result, the specifying unit 48 determines that the user #1's emotion for the shooting target represented by the target information "E," that is, the user #1's emotion for the user #5 is in the "positive state" which is different from the first determination result illustrated in FIG. 8 as illustrated in (H) of FIG. 10. In other words, the specifying unit 48 can appropriately determine the user #1's emotion for the user #5 drawn to the user #1's emotion for the user #2.

Further, when this process is performed, the specifying unit 48 stores the user #1's emotion for the user #2 specified in the first process in the emotional information management table 45, and stores the user #1's emotion for the other users #2 to #E specified in the second process in the emotional information management table 45. As this process is performed, the specifying unit 48 can specify the user #1's emotion for all shooting targets shot by the user #1.

6. Second Variation Process Performed by Emotion Determining Server

Next, a second variation of a process performed when the emotion determining server 40 specifies the user's emotion for each shooting target will be described. For example, the extracting unit 47 notifies the specifying unit 48 of each of the emotional scores stored in the target information database 44, and causes the specifying unit 48 to specify an emotion when each image is shot by the user, that is, the user's emotion for each image. Further, the extracting unit 47 counts the number of times that each shooting target is shown in an image in which the user's emotion is determined as satisfying a predetermined condition.

Then, the extracting unit 47 specifies a shooting target whose counted number is larger than a predetermined threshold value, and excludes an emotional score collected from the user when an image including the specified shooting target is shot from the target information database 44. Further, the extracting unit 47 extracts an emotional score corresponding to a target information representing the shooting target for each shooting target from the emotional scores remaining in the target information database 44, and outputs the extracted emotional scores to the specifying unit 48. Thereafter, the specifying unit 48 specifies the user's emotion for each shooting target based on the average value of the emotional scores received from the extracting unit 47.

For example, the extracting unit 47 notifies the specifying unit 48 of an emotional score of each entry stored in the target information database 44 one by one. In this case, the specifying unit 48 determines the user's emotion using the received emotional score individually. In other words, the specifying unit 48 specifies the user's emotion for each image shot by the user #1. Then, the specifying unit 48 notifies the extracting unit 47 of the specifying result.

Further, the extracting unit 47 stores emotional information representing an emotion notified from the specifying unit 48 in the target information database 44. As a result, the extracting unit 47 stores information illustrated in FIG. 11 in the target information database 44. FIG. 11 is a diagram for describing a variation of information stored in a target information database according to an embodiment.

Next, the extracting unit 47 specifies an entry in which the emotional information represents the "super negative state" among the entries of the target information database 44 as illustrated in (I) of FIG. 11. Then, the extracting unit 47 counts the number of pieces of target information included in the specified entry for each target information.

For example, in the example illustrated in FIG. 11, the extracting unit 47 counts "3" as the number of pieces of the target information "B" included in the specified entry and "2" as the number of pieces of the target information "C," and "2" as the number of pieces of the target information "E." Then, the extracting unit 47 compares the counted number of pieces of each piece of target information with a predetermined threshold value, for example, "3." Thereafter, the extracting unit 47 deletes the entry including the target information "B" whose counted number is the predetermined threshold value or more from the target information database 44.

Then, the extracting unit 47 extracts an emotional score of the entry including target information representing a shooting target from the target information database 44 for each shooting target, and outputs the extracted emotional scores to the specifying unit 48. As a result, the specifying unit 48 determines the user #1's emotion for the shooting targets represented by the target information "C" to "E" again using the average value of the emotional scores extracted again by the extracting unit 47 as illustrated in FIG. 12.

In other words, the extracting unit 47 counts the number of times that each shooting target is shown in an image in which the user's emotion is determined as satisfying a predetermined condition. Then, the extracting unit 47 determines the user #1's emotion for each shooting target using an emotional score acquired from an image not including a shooting target whose counted number is a predetermined threshold value or more.

FIG. 12 is a second diagram for describing an example of emotional information specified by a specifying unit according to an embodiment after noise removal. The specifying unit 48 calculates an average value of emotional scores extracted again by the extracting unit 47, and specifies the user #1's emotion for each of the target information "C" to "E" based on the calculated average value as illustrated in FIG. 12. As a result, the specifying unit 48 determines the "super positive state" which is different from the determination result illustrated in FIG. 8 as the user #1's emotion for the shooting target represented by the target information "E" as illustrated in (J) of FIG. 12.

7-1. Flow of Process Performed by Emotion Determining Server

Figure 13:
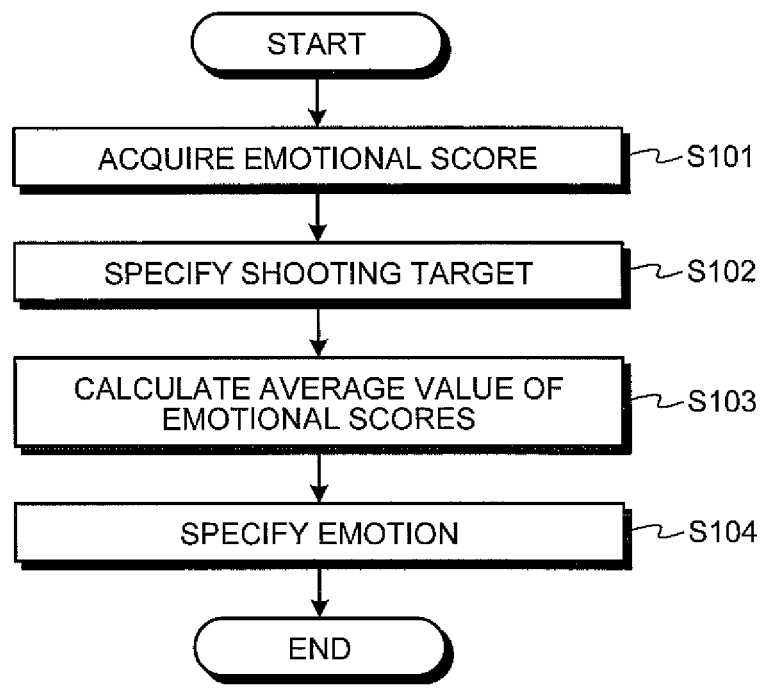
FIG. 13 is a diagram for describing the flow of a process performed by an emotion determining server according to an embodiment.

Next, the flow of a process performed by the emotion determining server 40 will be described with reference to FIG. 13. FIG. 13 is a diagram for describing the flow of a process performed by an emotion determining server according to an embodiment. For example, as illustrated in FIG. 13, the emotion determining server 40 acquires an emotional score when an image is shot by the user from the image to be opened by the social network server 30 (step S101).

Further, the emotion determining server 40 specifies a shooting target shown in an image shot by the user (step S102). Then, the emotion determining server 40 calculates an average value of emotional scores acquired from an image including the shooting target for each shooting target (step S103). Thereafter, the emotion determining server 40 specifies the user's emotion based on the calculated average value (step S104), and then ends the process.

Figure 14:
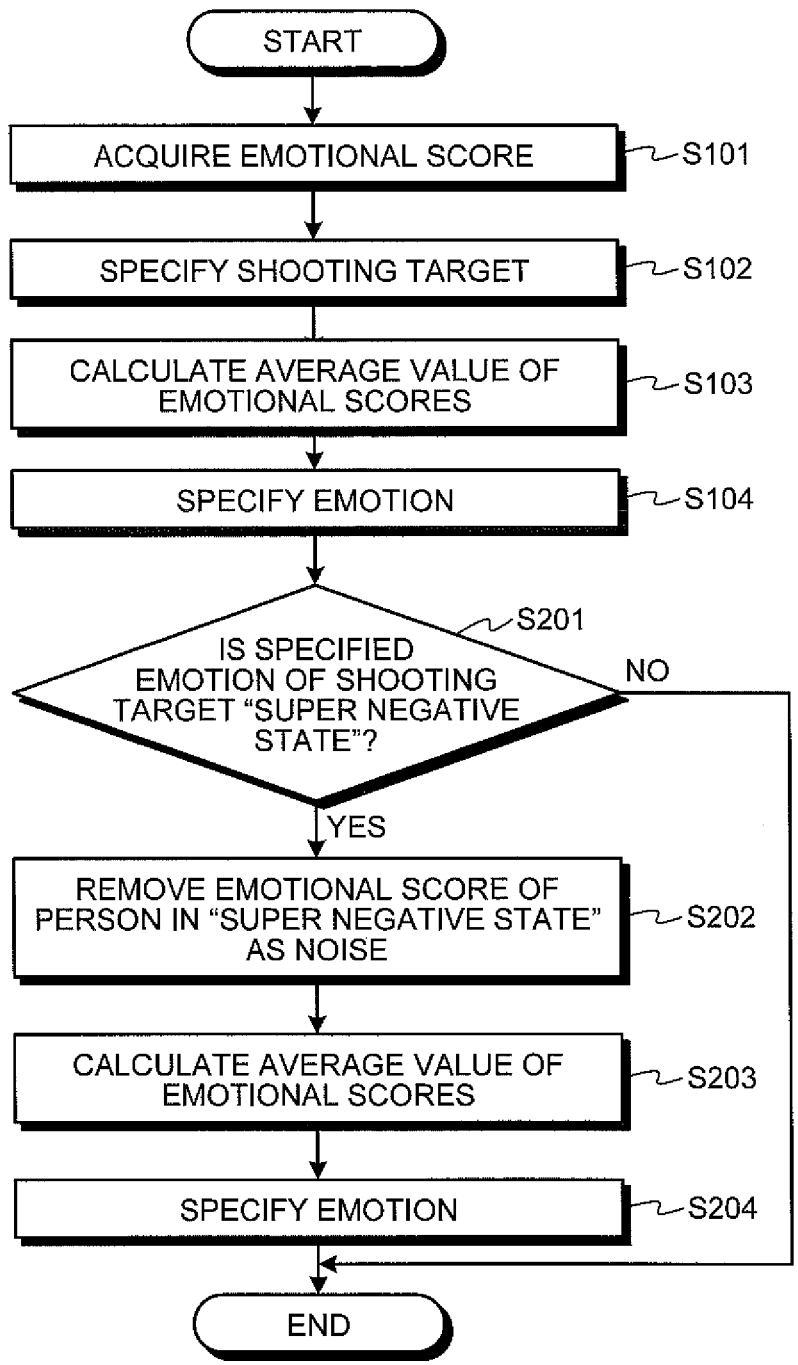
FIG. 14 is a diagram for describing the flow of a first variation of the process performed by the emotion determining server according to an embodiment.

7-2. Flow of First Variation of Process Performed by Emotion Determining Server Next, the flow of a first variation of the process performed by the emotion determining server 40 will be described with reference to FIG. 14. FIG. 14 is a diagram for describing the flow of a first variation of the process performed by the emotion determining server according to an embodiment. In the process illustrated in FIG. 14, the same steps as in the process illustrated in FIG. 13 are denoted by the same reference numerals, and thus a description thereof will not be repeated.

For example, the emotion determining server 40 determines whether the specified emotion of the shooting target is the "super negative state" (step S201), and performs the following process when the specified emotion of the shooting target is the "super negative state" (Yes in step S201). First, the emotion determining server 40 removes an emotional score acquired from an image including the shooting target having the user's emotion of the "super negative state" as noise (step S202).

Next, the emotion determining server 40 calculates an average value of emotional scores acquired from an image including the shooting target from the emotional scores from which noises is removed for each shooting target (step S203). Thereafter, the emotion determining server 40 specifies the user's emotion based on the calculated average value (step S204), and then ends the process. Meanwhile, when it is determined that the specified emotion of the shooting target is not the "super negative state" (No in step S201), steps S202 to S204 are not performed, and the process ends.

Figure 15:
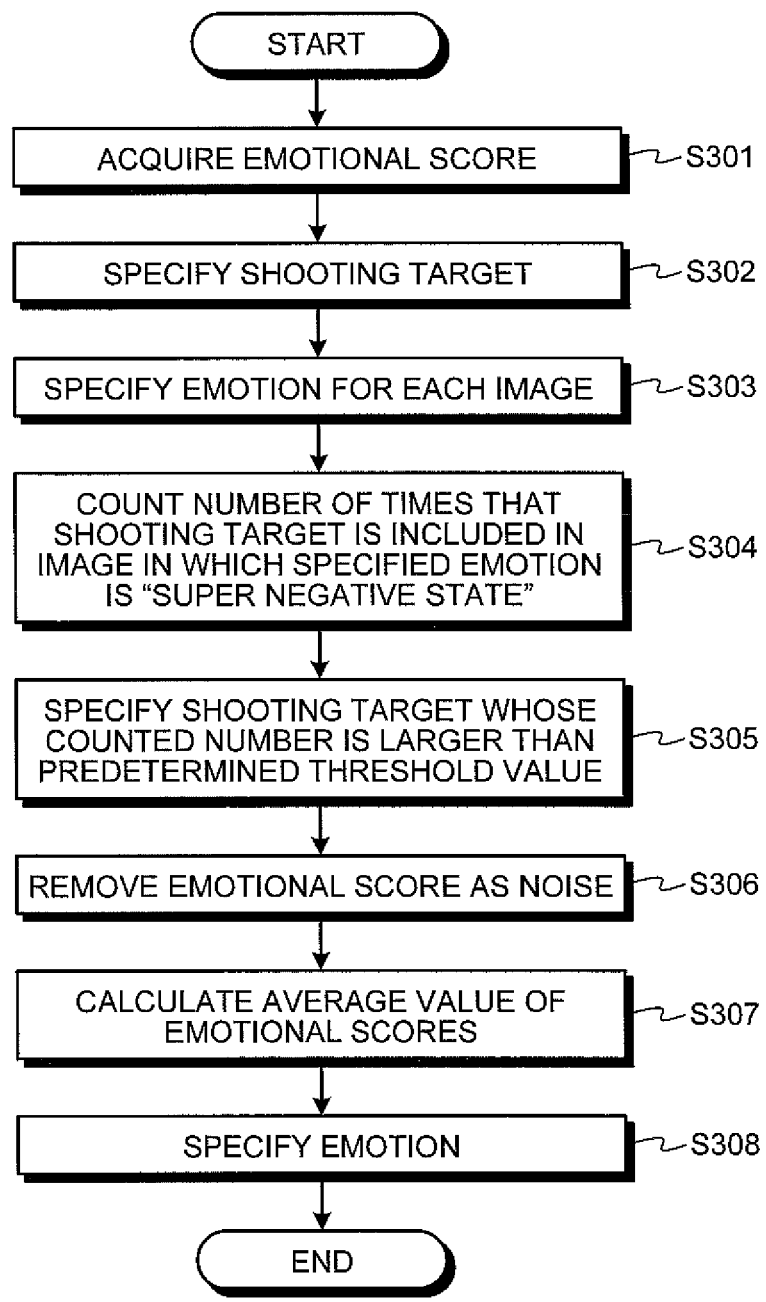
FIG. 15 is a diagram for describing the flow of a second variation of the process performed by the emotion determining server according to an embodiment.

7-3. Flow of Second Variation of Process Performed by Emotion Determining Server Next, the flow of a second variation of the process performed by the emotion determining server 40 will be described with reference to FIG. 15. FIG. 15 is a diagram for describing the flow of a second variation of the process performed by the emotion determining server according to an embodiment. For example, the emotion determining server 40 acquires an emotional score when an image is shot by the user from the image to be opened by the social network server 30 (step S301).

Further, the emotion determining server 40 specifies a shooting target shown in an image shot by the user (step S302). Then, the emotion determining server 40 specifies the user's emotion using the acquired emotional score for each image (step S303). Then, the emotion determining server 40 counts the number of times that each shooting target is included in the image in which the specified emotion is the "super negative state" (step S304). Then, the emotion determining server 40 specifies a shooting target whose counted number is larger than a predetermined threshold value (step S305), and removes an emotional score acquired from the image including the specified shooting target as noise (step S306).

Thereafter, the emotion determining server 40 calculates an average value of emotional scores acquired from an image including the shooting target based on the emotional scores from which noise is removed for each shooting target (step S307). Thereafter, the emotion determining server 40 specifies the user's emotion based on the calculated average value (step S308), and ends the process.

8. Modification

The information providing system 1 according to an embodiment may be implemented in various forms in addition to the above described embodiment. In this regard, the following description will be described in connection with other embodiments of the information providing system 1.

8-1. Relation Between Emotion Determining Server and Social Network Server

In the above embodiment, the information providing system 1 includes the social network server 30 that opens an image shot by the user to the public and the emotion determining server 40 that acquires the image shot by the user from the social network server 30, and specifies the user's emotion using the emotional score and the target information extracted from the acquired image. However, an embodiment is not limited to this example. For example, the functions of the social network server 30 and the emotion determining server 40 may be implemented by a single information processing device.

8-2. Social Network Server

In the above example, the social network server 30 opens the image shot by the user to the public. However, an embodiment is not limited to this example. For example, when a delivery request of an image to be opened by the user #1 is received from the user #2, the delivery unit 37 of the social network server 30 transmits an inquiry including the user ID "A" representing the user #1 and the target information "B" representing the user #2 to the emotion determining server 40.

Meanwhile, when the inquiry is received from the social network server 30, the providing unit 49 of the emotion determining server 40 extracts the user ID "A" and the target information "B" from the received inquiry. Then, the providing unit 49 acquires the emotional information in which the user ID "A" is associated with the target information "B" from the emotional information management table 45, and transmits the acquired emotional information to the social network server 30.

Thereafter, the delivery unit 37 of the social network server 30 determines whether the emotional information received from the emotion determining server 40 satisfies a predetermined condition (for example, whether the emotional information represents the "super negative state"), and gives a notification representing that it is difficult to open the image to the user #2 when it is determined that the received emotional information satisfies the predetermined condition. In addition, when it is determined that the received emotional information does not satisfy the predetermined condition, the delivery unit 37 transmits the requested image to the user #2.

Further, for example, when a browse request for data submitted by a second user is received from a first user, the delivery unit 37 may acquire the first user's emotion for the second user and the second user's emotion for the first user from the emotion determining server 40 and determine whether the data of the first user is to be opened to the second user according to the acquired emotions. For example, when both the first user's emotion for the second user and the second user's emotion for the first user are in the "super positive state," the delivery unit 37 may determine that the data of the first user is to be opened to the second user.

As described above, the social network server 30 can limit the disclosure of data such as an image or text submitted by the user according to the user's emotion specified by the emotion determining server 40.

8-3. Emotion Determination Server

In the above embodiment, the emotion determining server 40 notifies the user of the specified emotion by outputting the specified emotion to the head mount device 10 of the user. However, an embodiment is not limited to this example. For example, the emotion determining server 40 may provide information of the first user to the second user according to the first user's emotion for the second user and the second user's emotion for the first user.

Specifically, the emotion determining server 40 may notify the second user of the fact that the first user is friendly, the first user's profile, or the like. Further, the emotion determining server 40 may perform only updating of a social graph of each user managed by the social network server 30 or the emotion determining server 40 without making a proposal.

For example, the emotion determining server 40 acquires the first user's emotion for the second user and the second user's emotion for the first user with reference to the emotional information management table 45. Then, when the first user's emotion for the second user is in the "super positive state" and the second user's emotion for the first user is in the "positive state," the emotion determining server 40 may provide information of the first user to the second user.

Further, only when the first user's emotion for the second user is in the "excited state" and the second user's emotion for the first user is in the "relaxed state," the emotion determining server 40 may provide information of the first user to the second user. In other words, the emotion determining server 40 can use any condition as long as it is determined whether information of the first user is to be provided to the second user based on each user's emotion.

Further, the emotion determining server 40 can provide emotional information to each user at an arbitrary timing. Further, the emotion determining server 40 may provide emotional information to, for example, a terminal device of each user or the like rather than the head mount device 10 in a mail or message form of a push type.

Further, the emotion determining server 40 may specify the user #1's emotion for his/her friend and transmit the specified emotion to each friend. For example, when the user #1 and the users #3 and #D are friends, the emotion determining server 40 may provide the user #1's emotion for the users #3 and #D or the user #1's emotion for the users #2 and #E who are not friends to the users #3 and #D.

8-4. Target Information

In the above example, the emotion determining server 40 identifies a shooting target shown in each image using target information allocated to an image by the user's operation. However, an embodiment is not limited to this example. For example, the social network server 30 may specify a shooting target shown in an image from the received image using an image search technique or a face identification technique and may automatically allocate target information representing the specified shooting target to the image.

8-5. Process of Specifying Emotion

The emotion determining server 40 specifies the user's emotion for shooting target represented by target information using target information and emotional score. However, an embodiment is not limited to this example. For example, the emotion determining server 40 may allocate a weighting of an emotional score based on line of sight information representing movement of a line of sight when an image is shot by the user and specify an emotion based on an average value of emotional scores in which the weighting is considered.

For example, the head mount device 10 has a function of detecting movement of the user's eyeballs using infrared light rays. Then, when an image is shot, the head mount device 10 generates an emotional score when an image is shot and line of sight information representing a range within a field of view which the user is observing, that is, a range of a shot image or like which a line of sight is viewing. Thereafter, the head mount device 10 allocates the emotional score and the line of sight information to the shot image, and transmits the resultant image to the social network server 30.

Meanwhile, the social network server 30 requests an input of a range in which each shooting target is shown when target information is allocated to an image by the user's operation for each piece of target information. In this case, for example, a terminal device operated by the user displays a frame of a predetermined size to be superimposed on an image. Then, the terminal device requests the user to perform an operation of moving the frame to the range in which the shooting target is shown.

Further, when the user moves the frame to the range in which the shooting target is shown, the terminal device requests an input of target information representing a shooting target to be moved to the inside of the frame. Then, when target information representing a shooting target to be moved to the inside of the frame is input, the social network server 30 allocates a set of position information representing the position of the frame and target information representing a shooting target to be moved to the inside of the frame to the image in association with each other.

In this case, the emotion determining server 40 extracts the image to which target information representing a shooting target serving as a determination target is allocated from images to be opened by the social network server 30. Further, the emotion determining server 40 performs the following process on each extracted image. First, the emotion determining server 40 extracts position information associated with target information representing a shooting target serving as a determination target and line of sight information. Then, the emotion determining server 40 calculates a degree of coincidence representing how much the extracted position information overlaps the line of sight information, and calculates the product of an emotional score allocated to an image and the calculated degree of coincidence. Thereafter, the emotion determining server 40 determines the user's emotion based on an average value of the calculated product.

In other words, the emotion determining server 40 increases the value of the emotional score extracted from the image when a range in which a shooting target is shown matches a direction in which the user is viewing for a certain image, but reduces the value of the emotional score extracted from the image when a range in which a shooting target is shown is different from a direction in which the user is viewing. By performing this process, the emotion determining server 40 can specify the user's emotion for the shooting target in view of a weighting according to a line of sight when the image is shot by the user. As a result, the emotion determining server 40 can appropriately specify the user's emotion for the shooting target.

Further, the process of specifying an emotion in view of a weighting based on the line of sight information can be implemented in combination with the first variation or the second variation. Further, the emotion determining server 40 may perform a process other than the above-described process as long as a weighting is considered for an emotional score extracted from an image.

8-6. Allocation of Target Information

The above-described social network server 30 stores target information input manually by the user. However, an embodiment is not limited to this example. For example, the social network server 30 may automatically acquire target information representing a shooting target shown in an image using a known face recognition technique.

For example, the social network server 30 manages identification information identifying the user's face and target information representing the user in association with each other. Then, the social network server 30 specifies the user shown in the submitted image using identification information. For example, the social network server 30 extracts a range considered as a face of a shooting target from an image, and calculates identification information based on a shape or an arrangement of an eyebrow, an eye, a nose, an ear, or the like from the extracted range. Then, the social network server 30 allocates target information associated with the identification information to the image when the calculated identification information matches identification information managed in advance or falls in a similar range.

The face recognition technique may be performed by the emotion determining server 40 or may be performed by the social network server 30 or a server device other than the emotion determining server 40. Further, the face recognition technique may be performed before an image is submitted to the social network server 30. For example, the head mount device 10 may specify target information of a shooting target shown in a shot image using the face identification technique, allocate the specified target information to the shot image, and transmit the resultant image to the social network server 30.

Further, for example, the head mount device 10 transmits the shot image to the server device that specifies a shooting target through a face identification technique, and receives target information of a shooting target shown in the shot image from the server device. Then, the head mount device 10 may allocate the received target information to the shot image and transmit the resultant image to the social network server 30.

Further, a process of automatically specifying a shooting target through a face identification technique and a process of specifying a shooting target manually input by the user may be combined.

8-7. Shooting Timing of Image

In the above embodiment, the head mount device 10 shoots the user's field of view according to the user's operation. However, an embodiment is not limited to this example. For example, the head mount device 10 always automatically shoots the user's field of view. Further, the head mount device 10 may automatically shoot the user's field of view at predetermined time intervals or according to a biosensor value acquired from the user, an emotional score value, or the like.

Further, even when the head mount device 10 automatically performs shooting, specifying of a shooting target shown in a shot image may be manually performed by the user or may be automatically performed by an arbitrary device such as the head mount device 10, the social network server 30, the emotion determining server 40, or another server device using a face identification technique.

8-8. Biological Information

The above-described head mount device 10 acquires a biosensor value from the user and calculates an emotional score using the acquired biosensor value. Further, the emotion determining server 40 specifies the user's emotion for each shooting target using an average of the emotional scores calculated by the head mount device 10. However, an embodiment is not limited to this example. For example, the calculating of the emotional score may be performed by the social network server 30 or the emotion determining server 40. Further, the emotion determining server 40 may determine the user's emotion using a biosensor value such as a heart rate or an EDA as is without specifying the user's emotion from an emotional score.

In other words, in the above embodiment, the emotion determining server 40 may determine the user's emotion using biological information including arbitrary information acquired from the user such as a biosensor value or an emotional score. For example, the emotion determining server 40 may determine the user's emotion using an average value of biosensor values allocated to an extracted image. In the following description, a biosensor value and an emotional score are referred to as biological information.

8-9. Others

The functions of the social network server 30 and the emotion determining server 40 may be implemented by a plurality of server devices using a so-called cloud function. For example, the functions of the receiving unit 35, the updating unit 36, and the delivery unit 37 equipped in the social network server 30 may be implemented by different server devices. Further, the functions of the acquiring unit 46, the extracting unit 47, the specifying unit 48, and the providing unit 49 equipped in the emotion determining server 40 may be implemented by different server devices.

Among the processes described in the above embodiments, all or some of the processes described as being automatically performed may be manually performed, or all or some of the processes described as being manually performed may be automatically performed by a known technique. Further, a process procedure, a concrete name, information including various kinds of data or parameters described in the above description or the drawings may be arbitrarily changed unless otherwise set forth. For example, various kinds of pieces of information illustrated in each drawing are not limited to illustrated information. Further, for example, a user interface (UI) of an application illustrated in each drawing is not limited to the above example.

Each component of each device illustrated in the drawings is functional and conceptual and need not necessarily have the same physical configuration as illustrated in the drawings. In other words, a concrete form of dispersion and integration of respective devices is not limited to one illustrated in the drawings, and all or some of the respective devices may be functionally or physically dispersed or integrated in arbitrary units according to various kinds of loads or use states. Further, a function of each component may be implemented as a central processing unit (CPU) executes a predetermined specifying program.

9. Effects

As described above, the emotion determining server 40 acquires target information representing a shooting target shown in an image shot by the user and biological information acquired from the user when an image is shot for each plurality of images shot by the user. Further, the emotion determining server 40 extracts biological information corresponding to the target information representing the shooting target from the acquired biological information for each shooting target. Then, the emotion determining server 40 specifies the user's emotion for the shooting target using the extracted biological information. Thus, even when a plurality of shooting targets are shown in the image shot by the user, the emotion determining server 40 can individually specify the user's emotion for each shooting target.

Further, the emotion determining server 40 calculates an average value of the extracted biological information for each shooting target, and specifies the user's emotion for the shooting target based on the calculated average value. Thus, even when a plurality of shooting targets are shown in the image shot by the user, the emotion determining server 40 can individually specify the user's emotion for each shooting target.

Further, the emotion determining server 40 newly extracts biological information corresponding to target information representing to a shooting target for each shooting target based on biological information acquired from an image in which a shooting target in which the user's emotion satisfies a predetermined condition is not shown. Then, the emotion determining server 40 specifies the user's emotion for the shooting target again using the newly extracted biological information. As described above, the emotion determining server 40 excludes biological information related to a shooting target having a large emotion width from the acquired biological information as noise, and specifies the user's emotion for another shooting target based on the biological information from which noise is removed. Thus, the emotion determining server 40 can accurately specify the user's emotion for each shooting target.

Further, the emotion determining server 40 determines whether the user's emotion satisfies a predetermined condition using individual biological information acquired from the user when the image is shot for each image shot by the user. Further, the emotion determining server 40 counts the number of times that each shooting target is shown in an image in which the user's emotion is determined as satisfying the predetermined condition. Then, the emotion determining server 40 extracts biological information corresponding to target information representing a shooting target for each shooting target from biological information acquired from an image in which a shooting target whose counted number is a predetermined threshold value or more is not shown. Thereafter, the emotion determining server 40 specifies the user's emotion for the shooting target again using the extracted biological information. Thus, the emotion determining server 40 can accurately specify the user's emotion for each shooting target.

Further, the emotion determining server 40 further acquires line of sight information representing a shooting target that the user is observing when an image is shot. Then, the emotion determining server 40 specifies the user's emotion for each shooting target using biological information extracted for each shooting target and a weighting by the line of sight information corresponding to the biological information. As described above, the emotion determining server 40 specifies the user's emotion for each shooting target in view of a direction of a line of sight when an image is shot by the user and thus can accurately specify the user's emotion for each shooting target.

10. Program

Figure 16:
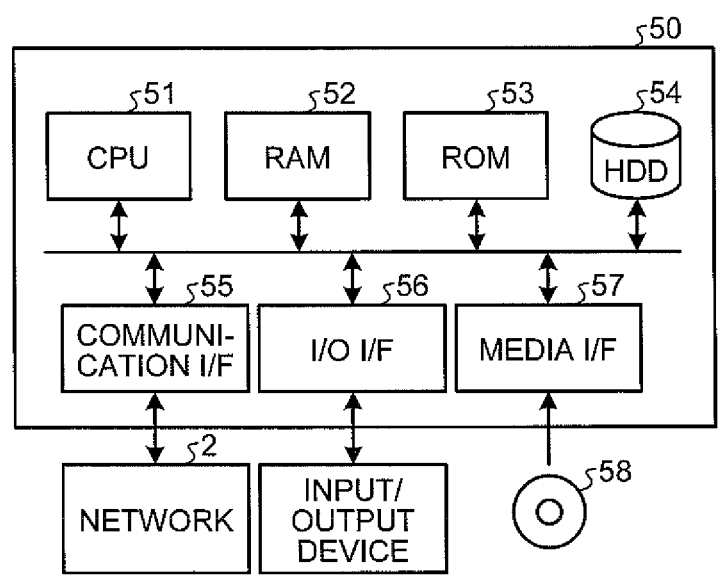
FIG. 16 is a diagram illustrating an exemplary hardware configuration of a computer that executes a specifying program.

The emotion determining server 40 in the above embodiments is implemented by executing a specifying program through a computer 50 having a configuration illustrated in FIG. 16. FIG. 16 is a diagram illustrating an exemplary hardware configuration of a computer that executes a specifying program. The computer 50 includes a central processing unit (CPU) 51, a random access memory (RAM) 52, a read only memory (ROM) 53, a hard disk drive (HDD) 54, a communication interface (I/F) 55, an input/output (I/O) I/F 56, and a media I/F 57.

The CPU 51 operates based on a program stored in the ROM 53 or the HDD 54, and controls the respective components. The ROM 53 stores a boot program which is executed by the CPU 51 when the computer 50 is activated, a program depending on hardware of the computer 50, and the like.

The HDD 54 stores the specifying program executed by the CPU 51, data used by the specifying program, and the like. For example, the HDD 54 stores data similar to the emotional information management table 45 illustrated in FIG. 6 or the like. The communication I/F 55 receives data from another device via the network 2, transfers the received data to the CPU 51, and transmits data generated by the CPU 51 to another device via the network 2.

The CPU 51 controls an output device such as a display or a printer and an input device such as a keyboard or a mouse through the I/O I/F 56. The CPU 51 acquires data from the input device through the I/O I/F 56. Further, the CPU 51 outputs generated data to the output device through the I/O I/F 56.

The media I/F 57 reads a specifying program or data stored in a recording medium 58, and provides the read specifying program or data to the CPU 51 through the RAM 52. The CPU 51 loads a corresponding program from the recording medium 58 onto the RAM 52 through the media I/F 57, and executes the loaded program. The recording medium 58 is a recording medium recording a specifying program according to the present application, and examples of the recording medium 58 include an optical recording medium such as a digital versatile disc (DVD) or a phase change rewritable disk (PD), a magneto optical recording medium such as a magneto-optical disk (MO), a tape medium, a magnetic recording medium, and a semiconductor memory.

When the computer 50 functions as the social network server 30 according to an embodiment, the CPU 51 of the computer 50 implements the functions of the acquiring unit 46, the extracting unit 47, the specifying unit 48, and the providing unit 49 by executing a program loaded onto the RAM 52.

The CPU 51 of the computer 50 reads the specifying program from the recording medium 58 and then executes the read specifying program, but as another example, the CPU 51 of the computer 50 may acquire the program from another device via the network 2.

According to an aspect of the embodiment, it is possible to specify the user's emotion on an individual shooting target.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device for use with a user, the information processing device comprising:
   a memory storing: (i) a plurality of target information, and (ii) a plurality of biological information; and
   a processor operatively coupled to the memory, the processor being programmed to:
      acquire: (i) the plurality of target information from an image shot by the user to be stored in the memory, the acquired target information representing at least one shooting target shown in the image shot by the user, and (ii) the biological information measured individually for each image from the user when the image is shot, the plurality of target information and the biological information are associated with each other, for each of a plurality of images shot by the user,
      count a number of times the shooting target is shown in the image,
      extract a plurality of biological information associated with target information representing a designated shooting target, and
      specify an emotion of the user, which corresponds to the designated shooting target, based on the counted number of times the shooting target is shown in the image and the extracted biological information.

2. The information processing device according to claim 1, wherein the processor is programmed to calculate an average value of the extracted biological information, and specify the user's emotion for the designated shooting target based on the calculated average value.

3. The information processing device according to claim 1, wherein the processor is programmed to:

newly extract biological information corresponding to target information representing the shooting target from acquired biological information, the acquired biological information being acquired from an image in which a shooting target having a specified emotion that satisfies a predetermined condition is not shown, and specify the user's emotion for the designated shooting target again using the newly extracted biological information.

4. The information processing device according to claim 1, wherein the processor is programmed to:

determine whether the user's emotion satisfies a predetermined condition using the acquired biological information individually for each image;

count a number of times that the shooting target is shown in an image in which the user's emotion is determined to satisfy a predetermined condition for each shooting target; and specify a shooting target in which the counted number of times is a predetermined threshold value or more, and extract biological information corresponding to target information representing the shooting target from biological information acquired from an image in which the specified shooting target is not shown.

5. The information processing device according to claim 1, wherein the processor is programmed to:

acquire: (i) line of sight information representing a shooting target which the user is observing when the image is shot, (ii) the target information, and (iii) the biological information for each plurality of images, and specify the user's emotion for the shooting target using: (i) the extracted biological information and (ii) a weighting by line of sight information corresponding to the biological information.

6. A specifying method performed by an information processing device, the specifying method comprising:

acquiring: (i) a plurality of target information from an image shot by a user to the stored in a memory, the acquired target information representing at least one shooting target shown in the image shot by and the user, and (ii) the biological information measured individually for each image from the user when the image is shot, the plurality of target information and the biological information are associated with each other, for each of a plurality of images shot by the user;

count a number of times the shooting target is shown in the image;

extracting a plurality of biological information associated with target information representing a designated shooting target; and specifying an emotion of the user, which corresponds to the designated shooting target, based on the counted number of times the shooting target is shown in the image and the extracted biological information.

7. The specifying method according to claim 6, wherein the specifying includes calculating an average value of the extracted biological information and specifying the user's emotion for the designated shooting target based on the calculated average value.

8. The specifying method according to claim 6, wherein the extracting includes extracting new biological information corresponding to target information representing the shooting target from biological information, which is acquired from an image in which a shooting target having a specified emotion satisfies a predetermined condition is not shown, and the specifying includes specifying the user's emotion for the designated shooting target again using the newly extracted biological information.

9. The specifying method according to claim 6, the specifying method further comprising:

determining whether the user's emotion satisfies a predetermined condition using the acquired biological information individually for each image;

counting a number of times that the shooting target is shown in an image in which the user's emotion is determined as satisfying a predetermined condition for each shooting target; and specifying a shooting target in which the number of times counted is a predetermined threshold value or more, and extracting biological information corresponding to target information representing the shooting target from biological information acquired from an image in which the specified shooting target is not shown.

10. The specifying method according to claim 6, wherein the acquiring includes acquiring: (i) line of sight information representing a shooting target which the user is observing when the image is shot, (ii) the target information, and (iii) the biological information for each plurality of images, and the specifying includes specifying the user's emotion for the shooting target using: (i) the extracted biological information and (ii) a weighting by line of sight information corresponding to the biological information.

11. A non-transitory computer readable storage medium storing a specifying program causing a computer to execute a process, the process comprising:

acquiring: (i) a plurality of target information from an image shot by a user to the stored in a memory, the acquired target information representing at least one shooting target shown in the image shot by and the user, and (ii) the biological information measured individually for each image from the user when the image is shot, the plurality of target information and the biological information are associated with each other, for each of a plurality of images shot by the user;

count a number of times the shooting target is shown in the image;

extracting a plurality of biological information associated with target information representing a designated shooting target; and specifying an emotion of the user, which corresponds to the designated shooting target, based on the counted number of times the shooting target is shown in the image and the extracted biological information.

12. The non-transitory computer readable storage medium according to claim 11, wherein the specifying includes calculating an average value of the extracted biological information and specifying the user's emotion for the designated shooting target based on the calculated average value.

13. The non-transitory computer readable storage medium according to claim 11, wherein the extracting includes extracting new biological information corresponding to target information representing the shooting target from biological information, which is acquired from an image in which a shooting target having a specified emotion satisfies a predetermined condition is not shown, and the specifying includes specifying the user's emotion for the designated shooting target again using the newly extracted biological information.

14. The non-transitory computer readable storage medium according to claim 11, the process further comprising:

determining whether the user's emotion satisfies a predetermined condition using the acquired biological information individually for each image;

counting a number of times that the shooting target is shown in an image in which the user's emotion is determined as satisfying a predetermined condition for each shooting target; and specifying a shooting target in which the number of times counted is a predetermined threshold value or more, and extracting biological information corresponding to target information representing the shooting target from biological information acquired from an image in which the specified shooting target is not shown.

15. The non-transitory computer readable storage medium according to claim 11, wherein the acquiring includes acquiring: (i) line of sight information representing a shooting target which the user is observing when the image is shot, (ii) the target information, and (iii) the biological information for each plurality of images, and the specifying includes specifying the user's emotion for the shooting target using: (i) the extracted biological information and (ii) a weighting by line of sight information corresponding to the biological information.

* * * * *